United States Patent Office 3,472,822
Patented Oct. 14, 1969

3,472,822
NITROSO RUBBER COPOLYMERS AND TERPOLYMERS OF FLUORINATED OLEFINS, NITROSO ESTERS AND HALO NITROSO ALKANES
Ward H. Oliver, Mobile, Ala., and Eugene C. Stump, Jr., Gainsville, Fla., assignors, by mesne assignments, to Calgon Corporation, a corporation of Delaware
No Drawing. Filed Oct. 14, 1966, Ser. No. 586,677
Int. Cl. C08g 15/40
U.S. Cl. 260—80.73
8 Claims

ABSTRACT OF THE DISCLOSURE

There are provided nitroso rubber copolymers having units of the formula

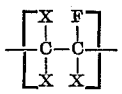

and units of the formula

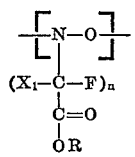

where X is chlorine, fluorine, perfluoro or chlorofluoro alkyl or alkene, and bromofluoro alkyl or alkane; $n$ is 1 to 3, R is lower alkyl and $X_1$ is fluorine or chlorine. The terpolymers additionally have units of

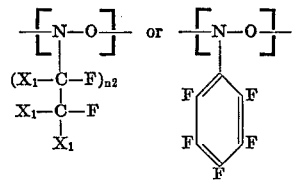

where $X_1$ is the same as above and $n_2$ is 0 to 5. The polymers are produced by bringing the reactants together at liquid air temperatures and thereafter reacting at between $-30$ and $-40°$ C.

---

This invention relates to copolymers and terpolymers containing nitroso-substituted esters of fluorocarbon acids and the process for producing such copolymers and terpolymers.

BACKGROUND OF THE INVENTION

Nitroso rubbers are known to the prior art. The nitroso rubbers produced by the prior art, such as, for example, the copolymer of tetrafluoroethylene and trifluoronitrosomethane, have little or no utility unless these polymers are cured. This problem of finding a cure for nitroso rubbers has been a significant problem but the prior art has not produced a suitable method of cross-linking nitroso rubbers. The copolymer of tetrafluoroethylene and trifluoronitrosomethane can be cured by diamines, but such diamine-cured products do not have satisfactory physical properties, and are especially deficient in tensile strength.

British Patent 943,224 discloses the preparation of mononitrosoalkanes and the polymerization of these compounds with tetrafluoroethylene ($CF_2=CF_2$). A 1:1 copolymer is obtained with the following linear structure:

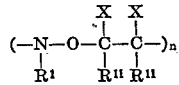

wherein $R^1$ is a perhalogenated alkyl radical, and $R^{11}$ is an alkyl group, halogen or hydrogen, X is halogen or hydrogen, and $n$ is generally 250 to 1,000. The patentees state "there is no evidence in the high molecular weight copolymer structure of cross-linking between copolymer chains by either of the monomers or monomer fragments."

The Rice Patent No. 3,213,050, issued Oct. 19, 1965, discloses a suspension polymerization process for the copolymerization of halogen containing mononitroalkanes with unsaturated comonomers, including tetrafluoroethylene. The copolymerization proceeds through free radical mechanism to produce high molecular weight polymers, which may be either thermoplastic or elastomeric.

The Rose U.S. Patent No. 3,065,214, issued Nov. 22, 1962, discloses a solid rubbery polymer obtained by polymerizing equimolecular quantities of trifluoronitrosomethane and tetrafluoroethylene. The patent discloses the formation of cross-linkages in the solid copolymer molecules by extended heating at temperatures of 70° to 100° C.

The Crawford U.S. Patent No. 3,072,592, issued Jan. 8, 1963, disloses the solution polymerization of trifluorosomethane with tetrafluoromethylene, while in solution in a fluorinated organic solvent, to produce a 1:1 nitroso rubber copolymer. The patentee does not disclose the cross-linking of the resultant rubber.

OBJECTS OF THE INVENTION

It is the object of this invention to provide a curable nitroso rubber polymer which contains nitroso-substituted esters of fluorocarbon acids, and a process for producing the same.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes or modifications within the scope of the invention will become apparent to those skilled in the art from this detailed description.

SUMMARY OF THE INVENTION

It has now been discovered that useful nitroso rubbers can be produced from monomeric compounds of the formula:

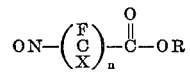

$n=1-3$; $X=Cl$ or $F$; $R=$alkyl or aromatic. These compounds can be polymerized with tetrafluoroethylene or other fluorinated olefins or terpolymerized with perfluoro, bromofluoro or chlorofluoro nitroso alkanes, such as trifluoromethane, and fluorinated olefins to produce nitroso rubbers which may be cross-linked, or cured, by standard free-radical curing agents, such as peroxides.

DESCRIPTION OF THE INVENTION

Nitroso rubbers are produced by polymerizing tetrafluoroethylene or other fluorinated olefins and at least one monomeric compound (hereinafter sometimes called "nitroso ester") of the formula:

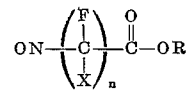

wherein each X is independently selected from fluorine and chlorine, $n$ is an integer of 1 to 3, and R is a lower alkyl radical or an aromatic radical, in the optional presence of perfluoro, chlorofluoro, or bromofluoro nitroso alkane as a termonomer. The preferred nitroso-substituted ester of a fluorocarbon acid of the above formula is

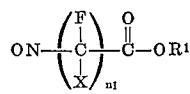

wherein $n_1$ is 2 or 3, and $R^1$ is lower alkyl. The preparation of these preferred comonomers is described in the copending application of Ward H. Oliver, Calvin D. Padgett, and Eugene C. Stump, Jr., entitled "Novel Nitroso-Substituted Esters of Fluorocarbon Acids and the Process for Producing the Same," filed of even date, now abandoned and replaced by co-pending application Ser. No. 726,203, filed May 2, 1968, the disclosure of which is hereby incorporated by reference.

The compound

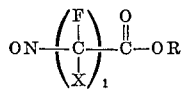

is disclosed in an article in Chem. Abstracts, volume 64, page 11080(c), 1966, by B. L. Dyatkin et al. (U.S.S.R.), and in the original Russian Article, Dolk. Akad. Nawk. SSSR, 166(1) p. 106–109 (1966), the disclosure of which are hereby incorporated by reference.

Suitable examples of the lower alkyl radical represented by R and $R^1$ included, for example, methyl, ethyl, propyl, isopropyl, butyl, tertiary butyl, pentyl, and hexyl. In general, the lower alkyl radical represented by R will contain from 1 to 6 carbon atoms. Suitable examples of aromatic radicals represented by R include phenyl, benzyl, naphthyl, tolyl, xylyl, and the like.

The nitroso-ester copolymers will contain 50 mole percent of the nitroso-ester compound and 50 mole percent of the fluorinated olefin. Monomer charges of 25 to 75 mole percent of the nitroso-ester and 75 to 25 mole percent of the fluoro olefin may be used, but the polymer produced will be a 1:1 copolymer. Optionally, a fluorinated alkyl nitroso compound may be substituted for a portion of the nitroso-ester, thereby producing a terpolymer.

The fluorinated alkyl nitroso compound may be any nitroso compound with a fluorinated alkyl radical of 1 to 6 carbon atoms. Suitable examples of such alkyl radicals include, for example, fluorinated methyl, ethyl, isopropyl, tetiary butyl, pentyl, and hexyl radicals. Pentafluoro nitroso benzene may also be used as the termonomer. The perfluorinated compounds are preferred but the fluorinated nitroso alkyl compounds may also contain chlorine and/or bromine atoms. The final copolymer will contain 50 mole percent of nitroso-ester and 50 mole percent of fluorinated olefin, whereas the terpolymer will generally contain 50 mole percent of the fluorinated olefin, 0.1 to 49 mole percent of the nitroso-ester, and 49.9 to 1 mole percent of the fluorinated alkyl nitroso compound.

It will be seen that the nitroso rubber copolymer of this invention will comprise 50 percent of units of the structure:

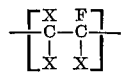

and 50 percent of units have the structure:

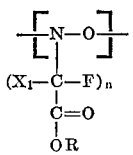

wherein each X is independently selected from fluorine, perfluoroalkyl, perfluoroalkene, chlorofluoroalkyl, chlorofluoroalkene, bromofluoroalkyl or bromofluoroalkene, $n$ is an integer of 1 to 3, and R is a lower alkyl radical, and $X_1$ is fluorine or chlorine.

The terpolymers of the present invention will comprise nitroso rubber terpolymers comprising 50 percent of units having the following structure:

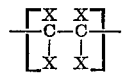

and 0.1 to 49 percent of units having the formula

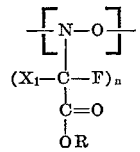

and 1 to 49.9 percent of units having the formula

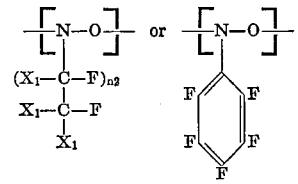

wherein each X is independently selected from chlorine, fluorine, perfluoroalkyl, perfluoroalkene, chlorofluoroalkyl, chlorofluoroalkene, bromofluoroalkyl or bromofluoroalkene, $n$ is an integer of 1 to 3, R is a lower alkyl radical, $n_2$ is an integer of 0 to 5, and $X_1$ is fluorine or chlorine.

The fluorinated olefin compounds which are used as monomers for the production of the polymer of this invention may be substituted or unsubstituted unsaturated organic compounds such as mono-olefins containing at least one fluorine atom on at least 1 carbon atom of a double bond, such as vinylidene fluoride, trifluoroethylene, tetrafluoroethylene, trifluorochloroethylene, unsymmetrical difluorodichloroethylene, trifluorobromoethylene, and perfluoropropene; the fluorine-containing diolefins, such as 1,1 - difluorobutadiene - 1,3, 1,1,2 - trifluorobutadiene-1,3, 1,1,3 - trifluorobutadiene - 1,3, 1,1 - difluoro - 2 - methylbutadiene - 1,3, 1,1 - difluoro - 3 - methylbutadiene - 1,3, 1,1 - difluoro - 2 - trifluoromethylbutadiene - 1,3, perfluorobutadiene, and 1,1,2,3,4 - pentafluorobutadiene. Combinations of any two or more of the above unsaturated fluoro compounds may be polymerized with the nitroso-ester.

Alternatively, the fluoroolefin compounds which are used as monomers in the polymerization process can be characterized as vinyl unsaturated compounds of 1 to 10 carbon atoms in length with substituents selected from the group consisting of fluorine, chlorine, hydrogen, bromine, trifluoromethyl, etc.

The polymers are cross-linked by a free-radical mechanism. This is accomplished by, for example, the use of peroxides. The basic polymerization of the monomers to produce the nitroso rubbers is believed to be also a free-radical mechanism but this does not effect the ester groups. The polymerization of the monomers gives soluble polymers which are essentially linear, and thereafter these linear soluble polymers are cross-linked by the free radical mechanism to produce elastomeric cross-linked polymers. Suitable peroxides, which may be mentioned by way of example, are benzoyl peroxide and dichlorobenzoyl peroxide. The resulting polymers and terpolymers generally have molecular weights in excess of 500,000, but can be oils of molecular weights as low as 100,000.

The copolymers and terpolymers of this invention are produced by condensing the monomers into a reaction vessel, for example, a Fischer-Porter tube, at low temperatures, e.g., liquid air temperature. The reaction vessel temperature is then allowed to rise to the reaction temperature, which will be within the general range −78 to +20° C., and preferably with the range of about −40 to −30° C. The reaction is exothermic and care must be taken to conduct heat from the reaction vessel rapidly enough to prevent an uncontrolled temperature rise, which can result in an explosion. While solution or suspension polymerization may be carried out in a manner which would avoid the possibility of explosions, the preferred method is to use bulk polymerization method as the possibility of hydrolysis of the ester group is obviated by this method. While the reaction pressures can vary widely from sub-atmospheric to superatmospheric pressures, the reaction is preferably carried out at autogenous pressures. On the laboratory level, batches of about 200 grams or less have been polymerized without difficulty, but for larger amounts care should be taken to insure definite control of the exothermic polymerization reaction. Due to the nature of the reaction, a catalyst is not required, although the scope of the present invention encompasses the production of nitroso rubbers containing nitroso-substituted esters of fluorocarbon acids with or without the aid of a catalyst. Generally, reaction temperatures in excess of +20° C. are to be avoided due to the formation of unwanted by-products. After polymerization the polymer may be removed from the reaction vessel, and thereafter it may, if desired, be fractionated by dissolving in suitable fluorohydrocarbon solvents, such as Freon 113 ($CF_2ClCFCl_2$), and then precipitated with acetone, for example.

The nitroso-ester copolymers and terpolymers are useful in application where the nitroso rubbers of the prior art have previously been used. Among applications for the copolymers and terpolymers of this invention may be mentioned sealants, adhesives, surface coatings, molded articles, etc. The copolymers and terpolymers find utility in both the uncured and cured states but the cross-linked, or cured, product finds wider uses.

The invention will be understood more readily by reference to the following examples; however, these examples are intended to illustrate the invention and are not to be construed to limit the scope of the invention.

Examples 1–12

Examples 1–12 used the following general polymerization procedure: The reaction monomers were condensed into the reaction vessel (a Fischer-Porter tube) at liquid air temperatures. The reaction vessel was then placed in a cold bath maintained at −30° C. When the polymerization was in suspension, the vessel was shaken. The polymer was removed and fractionated by dissolving in Freon 113 and then precipitating with acetone.

The reaction conditions are described in Table I, below:

TABLE I

| Example No. | Monomers | Amount Grams | Amount Moles | Polymerization system | Time, hours | Temp., °C. | Yield, grams | Conversion, percent | Remarks |
|---|---|---|---|---|---|---|---|---|---|
| 1 | $CF_3NO$ | 9.5 | 0.095 | Bulk | 48 | −30 | 9.5 | 46 | Elastomeric gum. |
|   | $CF_2=CF_2$ | 10.0 | 0.100 | | | | | | |
|   | $CH_3O_2C(CF_2)_3NO$ | 1.5 | 0.005 | | | | | | |
| 2 | $CF_3NO$ | 16.6 | 0.166 | ....do | 48 | −30 | 20 | 53 | Do. |
|   | $CF_2=CF_2$ | 17.1 | 0.171 | | | | | | |
|   | $CH_3O_2C(CF_2)_3NO$ | 4.0 | 0.019 | | | | | | |
| 3 | $CF_3NO$ | 16.6 | 0.16 | ....do | 48 | −30 | 25 | 66 | Gum; fractionated; [$\eta$]=0.32. |
|   | $CF_2=CF_2$ | 17.1 | 0.17 | | | | | | |
|   | $ONCF_2CF_2CO_2CH_3$ | 3.8 | 0.02 | | | | | | |
| 4 | $CF_3NO$ | 16.6 | 0.16 | ....do | 48 | −30 | 15 | 42 | Gum; fractionated; [$\eta$]=0.36. |
|   | $CF_2=CF_2$ | 17.1 | 0.17 | | | | | | |
|   | $ONCF_2CF_2CO_2CH_3$ | 2.0 | 0.01 | | | | | | |
| 5 | $CF_3NO$ | 18.9 | 0.191 | ....do | 24 | −32 | 22.5 | 50 | [$\eta$]=0.26; gum. |
|   | $CF_2=CF_2$ | 21.2 | 0.212 | | | | | | |
|   | $ON(CF_2)_3CO_2CH_3$ | 5.5 | 0.021 | | | | | | |
| 6 | $CF_3NO$ | 16.7 | 0.169 | ....do | 24 | −32 | 21.0 | 44 | [$\eta$]=0.29; gum. |
|   | $CF_2=CF_2$ | 21.2 | 0.212 | | | | | | |
|   | $ON(CF_2)_3CO_2CH_3$ | 10.1 | 0.042 | | | | | | |
| 7 | $CF_3NO$ | 21.1 | 0.213 | Suspension (shaker used). | 96 | −35 | 42 | 69 | Brown gum. |
|   | $CF_2=CF_2$ | 26.9 | 0.269 | | | | | | |
|   | $ON(CF_2)_3CO_2CH_3$ | 12.5 | 0.052 | | | | | | |
| 8 | $CF_3NO$ | 77.1 | 0.779 | Bulk | 24 | −30 | 168 | 80 | Gum contained some unreacted nitroso ester which was removed under vacuum, [N]=0.5 in FC-43. |
|   | $CF_2=CF_2$ | 94.5 | 9.945 | | | | | | |
|   | $ON(CF_2)_3CO_2CH_3$ | 37.4 | 0.156 | | | | | | |
| 9 | $CF_3NO$ | 356 | 3.60 | ....do | | −45 | | | Exploded after several hours, 145 g. terpolymer recovered, (N)=.25 in FC-75 gum. |
|   | $CF_2=CF_2$ | 400 | 4.00 | | | | | | |
|   | $ON(CF_2)_3CO_2CH_3$ | 95.5 | 0.40 | | | | | | |
| 10 | $CF_3NO$ | 43.82 | 0.443 | ....do | 48 | −30 | | | |
|    | $CF_2=CF_2$ | 53.68 | 0.537 | | | | | | |
|    | $ON(CF_2)_3CO_2CH_3$ | 21.20 | 0.089 | | | | | | |
| 11 | $CF_3NO$ | 41.77 | 0.422 | ....do | 36 | −30 | 245 | 72 | Polymer obtained was combined, 10 g. unreacted nitroso ester recovered. Gum. |
|    | $CF_2=CF_2$ | 51.16 | 0.512 | | | | | | |
|    | $ON(CF_2)_3CO_2CH_3$ | 20.20 | 0.085 | | | | | | |
| 12 | $CF_3NO$ | 40.18 | 0.406 | ....do | 36 | −30 | | | |
|    | $CF_2=CF_2$ | 49.23 | 0.492 | | | | | | |
|    | $ON(CF_2)_3CO_2CH_3$ | 19.40 | 0.081 | | | | | | |

Example 13.—Terpolymer of $CF_3NO/CF_2=CF_2/CN_3O_2CCF_2NO$

A 30-ml. glass ampule was evacuated and trifluoronitrosomethane (3.9 g., 0.04 mole), tetrafluoroethylene (5.0 g., 0.05 mole) and $ONCF_2CO_2CH_3$ (1.4 g., 0.01 mole) were condensed in the ampule. The ampule was placed in a bath at −35° C., and shaken for 48 hours. The ampule was opened and unreacted volatile material (2 g.) removed. A colorless elastomeric gum (8 g.) remained. Intrinsic viscosity in perfluorotributyl amine was 1.1. An infrared spectrum of the polymer exhibited peaks at 3.35 microns and 5.57 microns, attributed to methyl and carbonyl ester groups in the polymer.

Example 14.—Terpolymer of $CF_3NO/CF_2=CF_2/CH_3O_2CCFClNO$

Example 13 was repeated using trifluoronitrosomethane (3.9 g., 0.04 mole), tetrafluoroethylene (5.0 g., 0.05 mole) and $ONCFClCO_2CH_3$ (1.56 g., 0.01 mole). After 48 hours at −35° a colorless gum polymer (7.5 g.) was obtained. Incorporation of the nitroso-ester was substantiated by infrared analysis, which revealed absorption peaks at 3.35 and 5.56 microns.

Example 15.—Copolymer of $CF_2=CF_2/CH_3O_2CCF_2NO$

A 30-ml. glass ampule was evacuated and charged with $ONCF_2CO_2CH_3$ (2.8 g., 0.02 mole) and tetrafluoroethylene (2.0 g., 0.02 mole). The ampule was shaken at −35° for 64 hours. A colorless gum (3.4 g.) was obtained with an intrinsic viscosity of 0.8 in perfluorotributylamine.

Example 16.—Terpolymer of $CF_3NO/CF_2=CFBr/CH_3O_2C(CF_2)_3NO$

Example 13 was repeated using $CH_3O_2C(CF_2)_3NO$ (2.4 g., 0.01 mole), trifluoronitrosomethane (3 g., 0.03 mole) and bromotrifluoroethylene (6.4 g., 0.04 mole). After 72 hours at −35° C. a colorless, hard gum terpolymer (8 g.) was obtained.

Example 17.—Terpolymer of
$CF_3NO/CF_2{=}CFCF{=}CF_2/CH_3O_2C(CF_2)_3NO$

Example 16 was repeated using $CH_3O_2C(CF_2)_3NO$ (2.4 g., 0.01 mole), trifluoronitrosomethane (2.0 g., 0.02 mole) and perfluorobutadiene (5.0 g., 0.03 mole). After 48 hours at −35° C. the ampule was opened and volatile material (5 g.) removed on a vacuum line. The remaining material (4 g.) was a colorless gum terpolymer. An infrared spectrum of the polymer exhibited peaks at 3.35, 5.55–5.60, and 5.80 microns, as well as the usual peaks associated with nitroso polymers.

Example 18.—Terpolymer of
$CF_3NO/CF_2{=}CFCH{=}CH_2/CH_3O_2C(CF_2)_3NO$

Example 17 was repeated using $CH_3O_2C(CF_2)_3NO$ (2.4 g., 0.01 mole), trifluoronitrosomethane (2 g., 0.02 mole) and 1,1,2-trifluorobutadiene (3.2 g., 0.03 mole). After 72 hours at −35° C., the ampule was opened and volatile material removed on a vacuum line. The remaining material (3.5 g.) was a colorless gum terpolymer whose infrared spectrum exhibited peaks typical of C—H, $CF_2{=}CF{-}$, $-CF{=}CH{-}$, and ester carbonyl.

Example 19.—Copolymer of
$CF_2{=}CF_2/CH_3CO_2(CF_2)_3NO$

A 30-ml. glass ampule was charged with $ON(CF_2)_3CO_2CH_3$ (4.8 g., 0.02 mole) and tetrafluoroethylene (2.0 g., 0.02 mole) and placed in a −35° bath for 24 hours. The product obtained was a colorless gum (3.9 g.) which gave an intrinsic viscosity of 0.5 in perfluorotributylamine.

Example 20.—Copolymer of
$CF_2{=}CF_2/CH_3O_2C(CF_2)_2NO$

A 30-ml. ampule was charged with $ON(CF_2)_2CO_2CH_3$ (4.7 g., 0.025 mole) and tetrafluoroethylene (2.5 g., 0.025 mole) and placed in a −35° bath for 38 hours. The product was a colorless gum (3.5 g.) which gave an intrinsic viscosity of 0.42 in perfluorotributylamine.

Obviously many modifications and variations of the present invention are possible in the light of the above teachings. It is therefore to be understood that within the scope of the appended claims the invention may be practiced otherwise than as specifically described.

We claim:
1. A nitroso rubber terpolymer comprising about 50% of units of the formula:

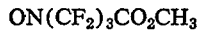

and about 0.1 to about 49% of units of the formula:

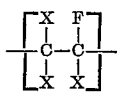

and about 1 to about 49.9% of units having the formula:

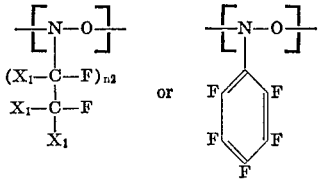

wherein each X is independently selected from chlorine, fluorine, perfluoroalkyl, perfluoroalkene, chlorofluoroalkyl, chlorofluoroalkene, bromofluoroalkyl, bromofluoroalkene, n is 2 or 3, $n_2$ is an integer of 0 to 5, and $X_1$ is fluorine or chlorine.

2. The terpolymer of claim 1, wherein X is fluorine.
3. The terpolymer of claim 2, wherein $X_1$ is fluorine.
4. The terpolymer of claim 3, wherein the last of said units has the formula:

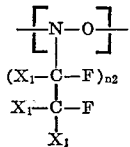

5. The terpolymer as claimed in claim 4, wherein $n_2$ is 0.
6. The terpolymer as claimed in claim 1, wherein said units are derived from tetrafluoroethylene, trifluoronitrosomethane, and a member selected from the group consisting of $ON(CF_2)_2CO_2CH_3$ and $ON(CF_2)_3CO_2CH_3$.
7. A nitroso rubber copolymer comprising about 50% of units of the structure:

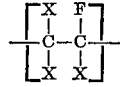

and about 50% of units having the structure:

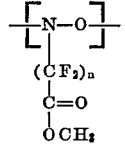

wherein each X is independently selected from chlorine, fluorine, perfluoroalkyl, perfluoroalkene, chlorofluoroalkyl, chlorofluoroalkene, bromofluoroalkyl, bromofluoroalkene, and n is 2 or 3.

8. The copolymer of claim 7, wherein X is fluorine.

References Cited

UNITED STATES PATENTS

| | | | |
|---|---|---|---|
| 3,310,543 | 3/1967 | Hazzeldine et al. | 260—92.1 |
| 3,321,454 | 5/1967 | Crawford et al. | 260—92.1 |
| 3,065,214 | 11/1962 | Rose | 260—92.1 |

FOREIGN PATENTS 843,795   8/1960   Great Britain.

OTHER REFERENCES

Fieser and Fieser: Advanced Organic Chem., Reinhold Publ. (N.Y.), pp. 370–378 (1961).

JOSEPH L. SCHOFER, Primary Examiner

C. A. HENDERSON, Jr., Assistant Examiner

U.S. Cl. X.R.

117—161; 260—647, 87.1